United States Patent [19]
Goldman

[11] Patent Number: 5,121,044
[45] Date of Patent: Jun. 9, 1992

[54] ELECTRICAL ENERGY SYSTEM

[75] Inventor: Arnold J. Goldman, Jerusalem, Israel

[73] Assignee: Luz Electric Fuel Israel, Ltd., Jerusalem, Israel

[21] Appl. No.: 555,921

[22] Filed: Jul. 19, 1990

[51] Int. Cl.$^5$ .............................................. H02J 7/00
[52] U.S. Cl. .................................... 320/2; 429/21; 307/66
[58] Field of Search ............... 320/2, 15; 290/1 R; 307/66; 429/15, 21, 27, 69, 70

[56] References Cited

U.S. PATENT DOCUMENTS

| | | | |
|---|---|---|---|
| 3,416,966 | 12/1968 | Oswin | 429/21 |
| 3,529,229 | 9/1970 | Kennedy | 320/2 |
| 3,716,413 | 2/1973 | Eisner | 429/21 |
| 3,847,671 | 11/1974 | Leparulo et al. | 429/15 |
| 4,084,038 | 4/1978 | Scragg et al. | 429/21 X |
| 4,124,805 | 11/1978 | Jacoby | 290/1 R |
| 4,147,839 | 4/1979 | Solomon et al. | 429/15 |
| 4,158,802 | 6/1979 | Rose, II | 320/2 |
| 4,275,310 | 6/1981 | Summers et al. | 290/1 R |
| 4,534,833 | 8/1985 | Carr et al. | 429/21 X |
| 4,797,566 | 1/1989 | Nozaki et al. | 307/66 X |
| 4,842,963 | 6/1989 | Ross, Jr. | 429/21 |
| 4,843,251 | 6/1989 | McSorley, Sr. | 307/66 |
| 4,894,764 | 1/1990 | Meyer et al. | 307/66 X |
| 4,908,281 | 3/1990 | O'Callaghan | 429/27 |
| 4,925,744 | 5/1990 | Niksa et al. | 429/27 |

OTHER PUBLICATIONS

P. C. Foller *Improved Slurry Zinc/Air Systems as Batteries for Urban Vehicle Propulsion*, Journal of Applied Electrochemistry 16 (1986) 527–543.

Hamlin, L. D. and Rodriguez, G. D., The Chino 10 MW/40 MWh Battery Energy Storage Project, Conference on Batteries for Utility Energy Storage Berlin, 1987.

Primary Examiner—Steven L. Stephan
Assistant Examiner—Kristine Peckman
Attorney, Agent, or Firm—Helfgott & Karas

[57] ABSTRACT

An electrical energy system including an electric utility having an electricity generating apparatus and distribution lines, a plurality of electric vehicles and electric power storage apparatus receiving electrical power from the electric utility and supplying electrical power to the plurality of electric vehicles and to the electric utility when required.

17 Claims, 21 Drawing Sheets

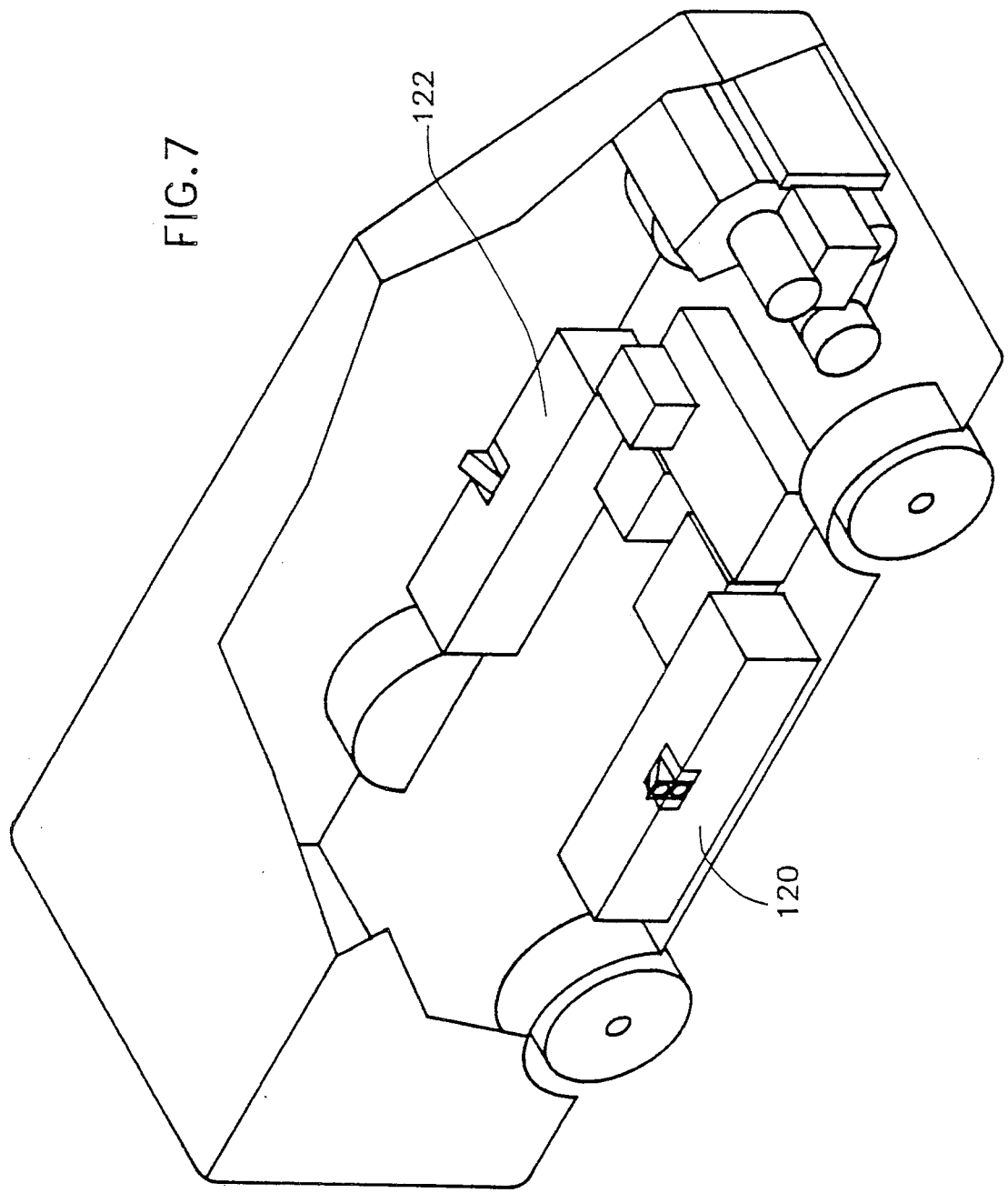

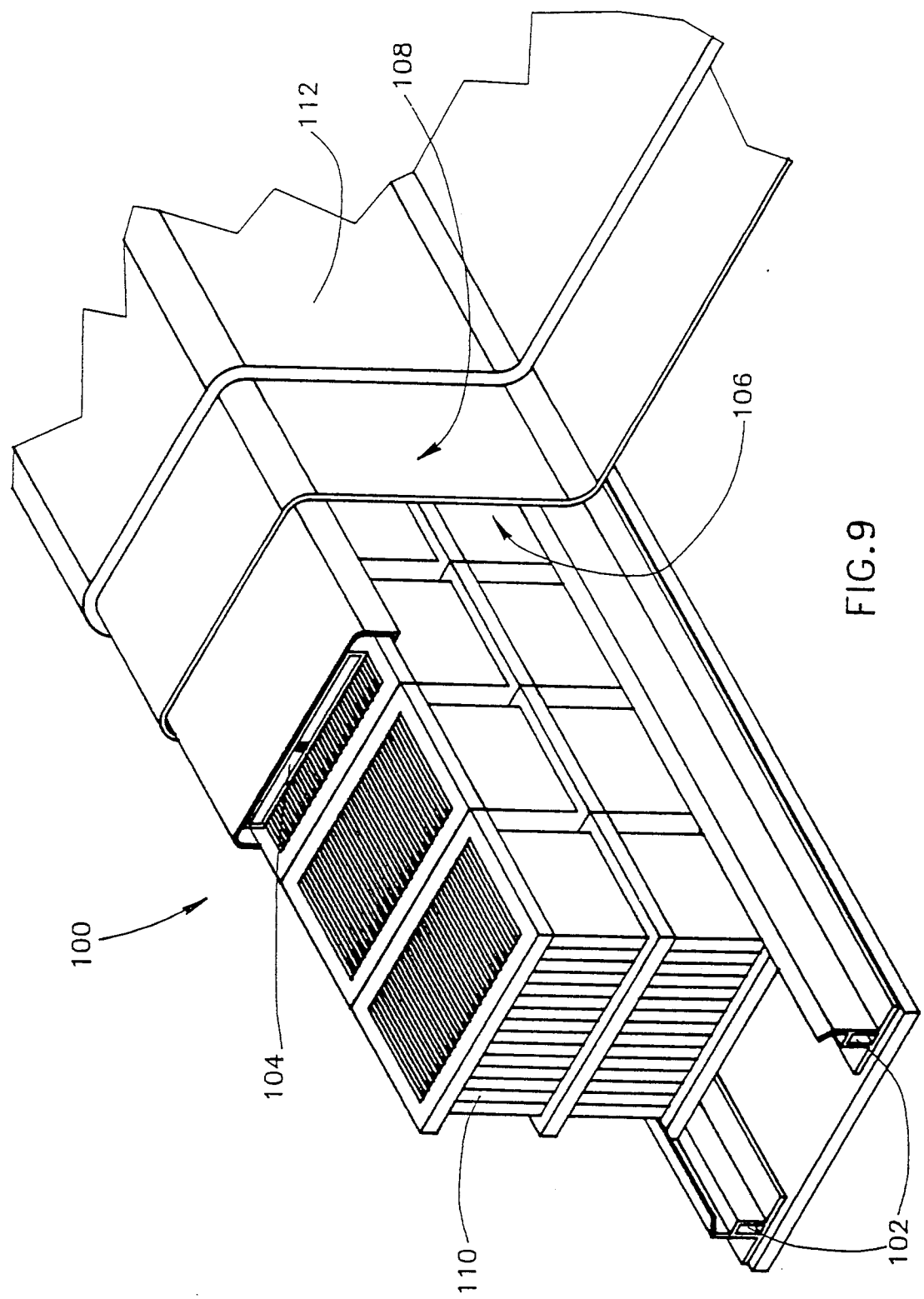

ELECTRICAL ENERGY SYSTEM

FIELD OF THE INVENTION

The present invention relates to electrical energy sy generally and more particularly to electrical energy systems incorporating electric vehicles.

BACKGROUND OF THE INVENTION

Over the years, various proposals have been made for electric powered vehicles. To date, for a number of reasons, electric vehicle systems have yet to become commercial for urban and highway applications.

There have been proposals to employ zinc/air batteries for urban vehicle propulsion. An example is the following publication:

Improved slurry zinc/air systems as batteries for urban vehicle propulsion, by P.C. Foller, Journal of Applied Electrochemistry 16 (1986), 527–543.

Metal/air battery structures are described in the following publications:

U.S. Pat. No. 4,842,963, entitled Zinc Electrode and Rechargeable Zinc-Air Battery;

U.S. Pat. No. 4,147,839, entitled Electrochemical Cell with Stirred Slurry;

U.S. Pat. No. 4,908,281, entitled Metal/air Battery with Recirculating Electrolyte;

U.S. Pat. No. 3,847,671, entitled Hydraulically-Refuelable Metal-Gas Depolarized Battery System;

U.S Pat. No. 4,925,744, entitled Primary Aluminum-Air Battery;

U.S. Pat. No. 3,716,413, entitled Rechargeable Electrochemical Power Supply;

U.S. Pat. No. 4,925,744, entitled Primary Aluminum-Air Battery;

Electrical energy storage systems are described in the following publications;

U.S. Pat. No. 4,843,251 entitled Energy Storage and Supply Recirculating Electrolyte;

Energy on Call by John A. Casazza et al, IEEE Spectrum June, 1976, pp 44–47;

U.S. Pat. No. 4,275,310, entitled Peak Power Generation;

U.S. Pat. No. 4,124,805, entitled Pollution-Free Power Generating and Peak Power Load Shaving System;

U.S. Pat. No. 4,797,566, entitled Energy Storing Apparatus.

The teachings of the U.S. patents mentions herein above are incorporated herein by reference.

SUMMARY OF THE INVENTION

The present invention seeks to provide an improved electrical energy system which through the synergistic combination of two disparate activities, each of which is presently uneconomical, provides an economical electrical utility off-peak power storage, surge protection, on-peak and super peak power supply, spinning reserve and electric vehicle system.

There is thus provided in accordance with a preferred embodiment of the present invention an electrical energy system including an electric utility having electricity generating apparatus and distribution lines, a plurality of electric vehicles and an electric power storage apparatus receiving electrical power from the electric utility and supplying electrical power to the plurality of electric vehicles and to the electric utility when required.

In accordance with a preferred embodiment of the invention, the electric power storage apparatus is operative to receive electrical power from the electric utility at times of low power demand and supply electrical power to the electrical utility at peak or high power demand times.

In accordance with a preferred embodiment of the invention, the electric power storage apparatus includes surge switching means for enabling the electric power storage apparatus to absorb undesired power surges from the electrical utility as needed.

In accordance with a preferred embodiment of the invention the electric power storage apparatus can supply electric energy for highpower demand as needed.

In accordance with a preferred embodiment of the invention the electric power storage apparatus can serve as a substitute for the maintenance of a spinning reserve by being able to provide electrical energy as needed.

Additionally in accordance with a preferred embodiment of the invention. the electric power storage apparatus includes electrical power storage units employing a liquid-like slurry, such as metal/air batteries, as a rechargeable electrical energy storage medium. The electric power storage apparatus may also comprise conventional batteries, such as lead-acid batteries. Where both types of batteries are employed. the conventional batteries are employed for relatively more frequent charging and discharging. while the metal/air batteries are employed for less frequent charging and discharging.

Further in accordance with a preferred embodiment of the invention, the electric vehicles include each a metal/air battery which employs the liquid-like slurry and which is recharged by replacement of discharged slurry by recharged slurry in a liquid transfer.

Additionally, there is provided in accordance with a preferred embodiment of the present invention an electric vehicle recharging depot including an apparatus for removing discharged slurry from vehicles and supplying it to a storage facility to await at low power demand and an apparatus for supplying recharged slurry to the vehicles from the electric power storage apparatus.

BRIEF DESCRIPTION OF THE DRAWINGS

The present invention will be understood and appreciated more fully from the following detailed description, taken in conjunction with the drawings in which:

FIGS. 6 and 7 are general schematic illustrations of two types of electric vehicle useful in the system of FIGS. 1 and 2;

FIG. 9 is a partially cut away illustration of the installation of a zinc-air battery in a vehicle of the type illustrated in FIG. 6;

DETAILED DESCRIPTION OF A PREFERRED EMBODIMENT

Figure 1:
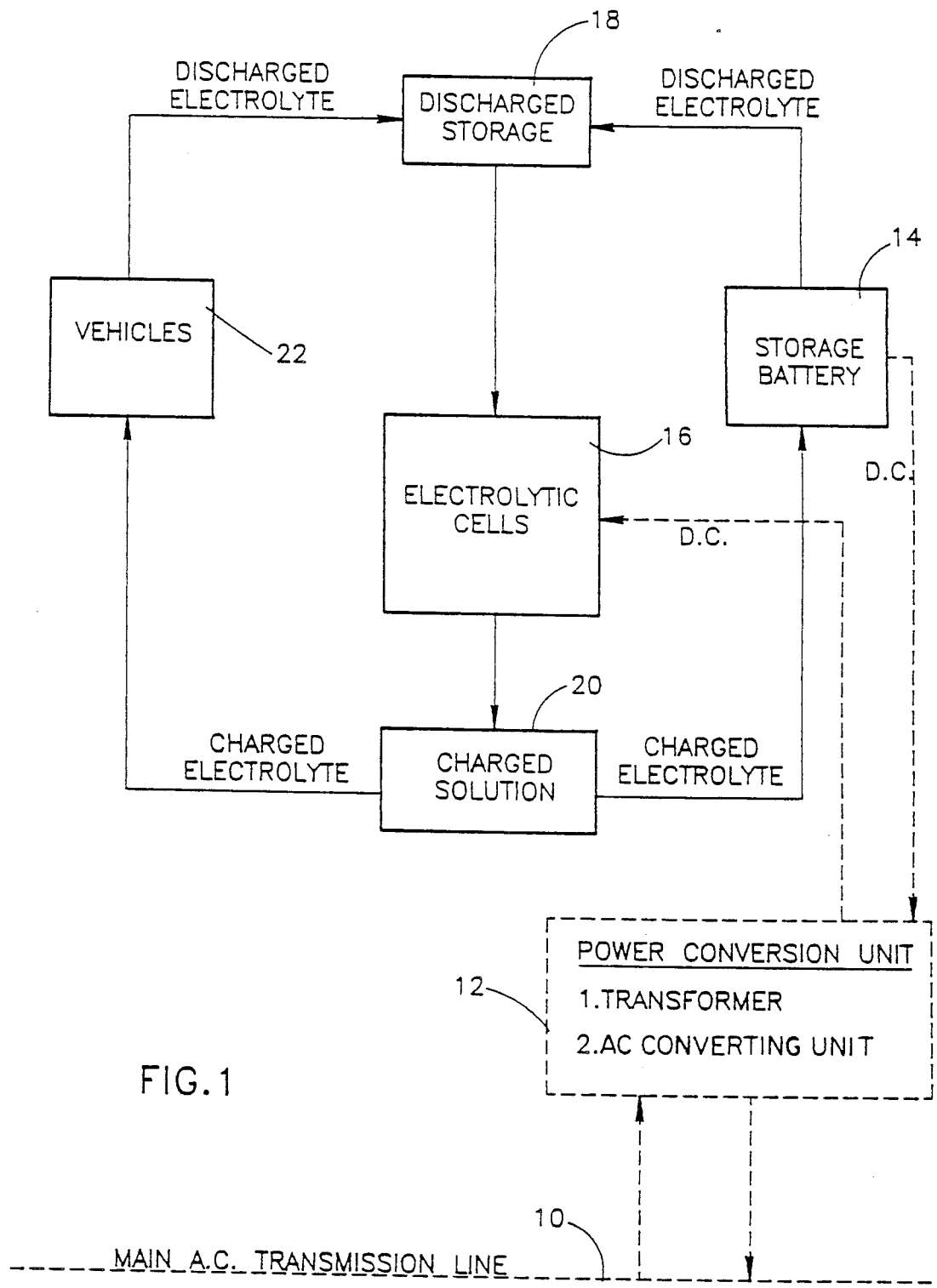
FIG. 1 is a block diagram illustrating an electrical energy system constructed and operative in accordance with a preferred embodiment of the present invention.

Reference is now made to FIG. 1, which illustrates in generalized block diagram form an electrical system constructed and operative in accordance with a preferred embodiment of the present invention and including an electrical utility having electricity generating apparatus and distribution lines, a plurality of electric vehicles and an electric power storage apparatus receiving electrical power from the electric utility and supplying electrical power to the plurality of electric vehicles and to the electric utility when required.

Illustrated in FIG. 1 is an AC transmission line 10 which is arranged for power transfer via a power conversion unit 12 with a storage battery bank 14 and with a bank of electrolytic cells 16. The electrolytic cells 16 are operative to electrically charge an energy storage slurry, such as a mixture of zinc granules and alkaline potassium hydroxide solution, thereby storing energy therein.

In the illustrated embodiment, discharged slurry is stored in a discharged slurry storage facility 18 and supplied to electrolytic cells 16 via suitable pumps (not shown). The charged slurry is received in a facility 20 and then stored in storage battery 14 or supplied to electric vehicles 22.

Discharged slurry is received at facility 18 from the electric vehicles 22 and from storage battery 14. The storage battery 14 provides, when necessary or economical, electrical power to transmission line 10 via conversion unit 12.

It will be appreciated by persons skilled in the art that the present invention, through the synergistic combination of two disparate activities, utility energy storage and electric vehicle operation, each of which is presently uneconomical, provides economical electrical utility power storage at times of low power demand, surge protection, high demand power supply, spinning reserve and electric vehicle system.

Figure 2:
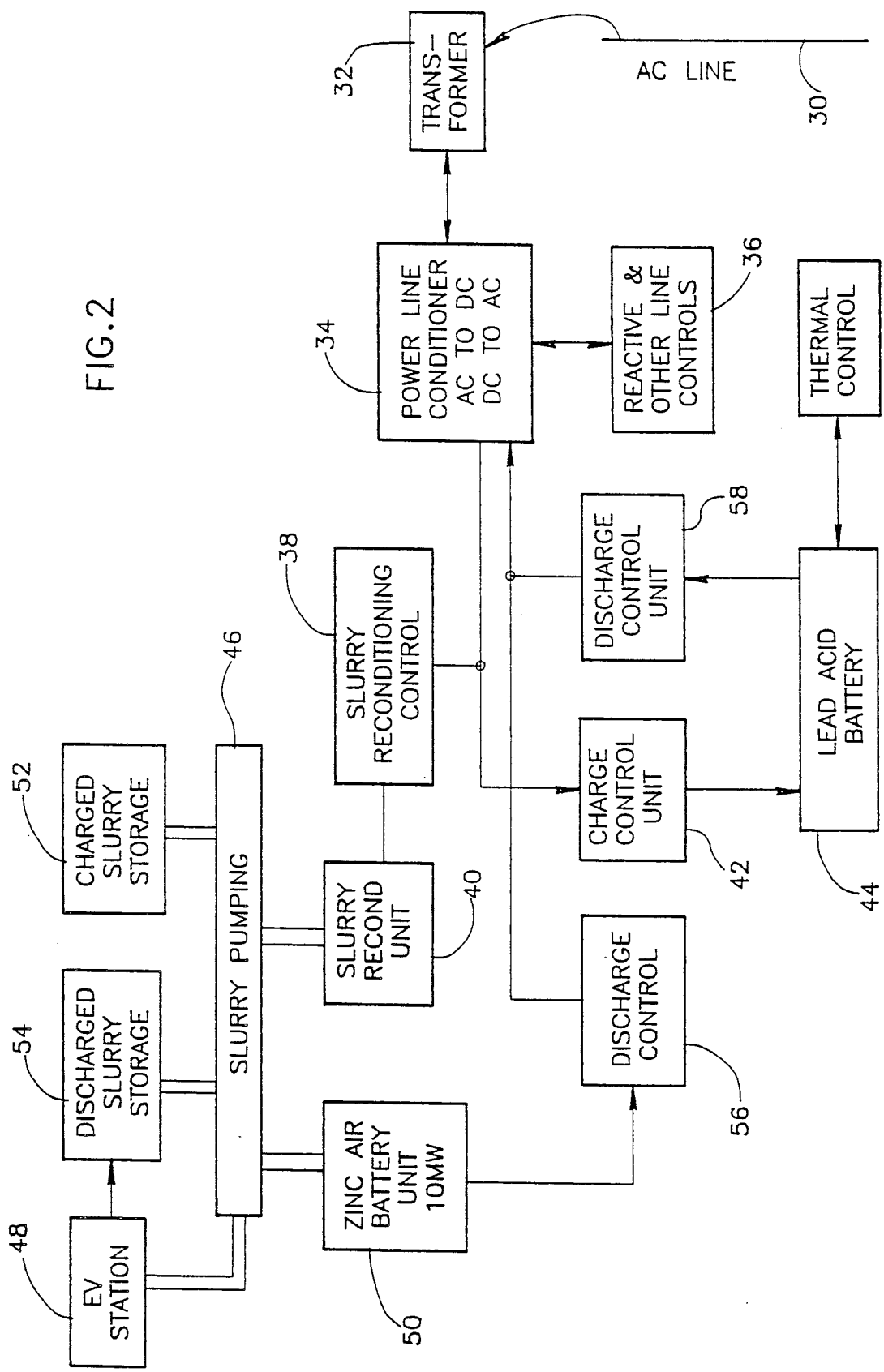
FIG. 2 is a more detailed block diagram of the system of FIG. 1.

Reference is now made to FIG. 2, which illustrates the system of FIG. 1 in greater detail. As shown in FIG. 2, the AC utility transmission line, here indicated by reference numeral 30, is coupled via a transformer 32 to a power line conditioner 34 which includes high capacity AC to DC and DC to AC converters. Reactive and other line control apparatus 36, such as peak switching in detectors may be associated with the power line conditioner 34.

A DC output of conditioner 34 may be supplied via a slurry reconditioning control circuitry 38 to a slurry reconditioning facility 40. The DC output of conditioner 34 may also be supplied via a charge control unit 42 to a bank of lead acid batteries 44.

Slurry reconditioning facility 40 is operative to provide charged slurry, via slurry pumping apparatus 46 to an electric vehicle refueling station 48, for supply to electric vehicles. Facility 40 is also operative to supply charged slurry via slurry pumping apparatus 46 to a zinc air battery 50. Charged slurry from facility 40 may also be stored in a charged slurry storage tank 52.

Discharged slurry removed from electric vehicles is supplied from electric vehicle refueling station 48 to a discharged slurry storage tank 54 and is supplied at appropriate times to facility 40 by slurry pumping apparatus 46. Normally recharging of slurry is carried out by facility 40 during times of low power demand for utility supplied electricity.

Electrical power may be drawn from battery 50 when needed, and supplied via discharge control circuitry 56, power line conditioner 34 and transformer 32 to the utility via power line 30. Normally power is supplied to the utility from battery 50 at times of high power consumption.

Electrical power may be drawn from battery 44 when needed, and supplied via discharge control circuitry 58, power line conditioner 34 and transformer 32 to the utility via power line 30. Normally power transfers between battery 44 and utility power line 30 take place in order to balance the impedance of the power line 30, to absorb short term peaks and shortfalls, typically having a time constant of less than one-half hour.

Figure 3:
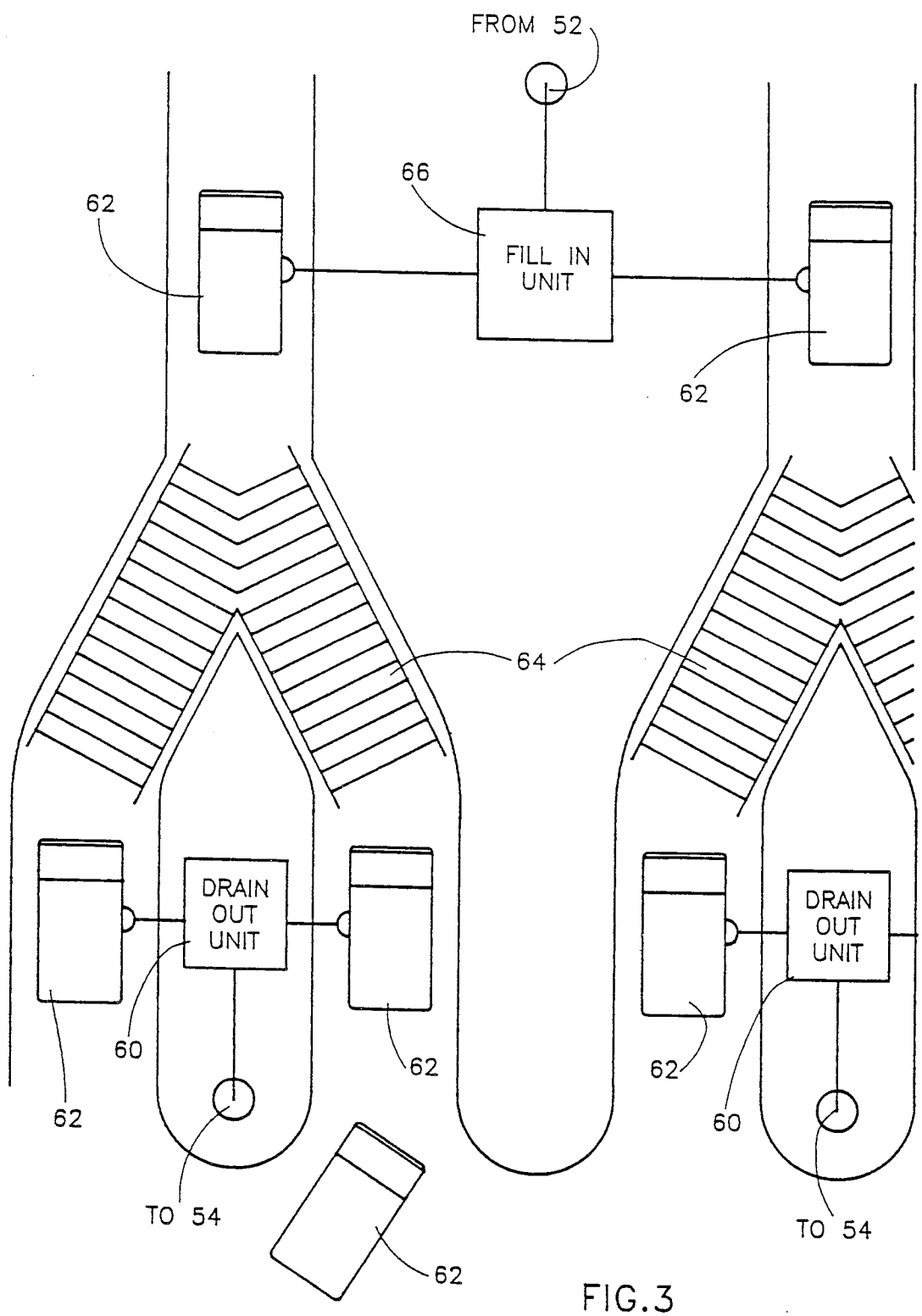
FIG. 3 is a schematic illustration of an electric vehicle battery recharging subsystem forming part of the system of FIGS. 1 and 2.

Reference is now made to FIG. 3, which is a, schematic illustration of an electric vehicle refueling station, such as station 48 (FIG. 2). As shown in FIG. 3, the refueling station includes a plurality of drain units 60 which are operative to remove discharged slurry from electric vehicles 62. The discharged slurry is supplied to discharged slurry storage tank 54 (FIG. 2).

Automatic moving platforms 64 are preferably provided for moving the electric vehicles 62 from the drain units 60 to charged slurry supply units 66, which supply charged slurry from charged slurry storage tank 52 to the electric vehicles 62.

Figure 4:
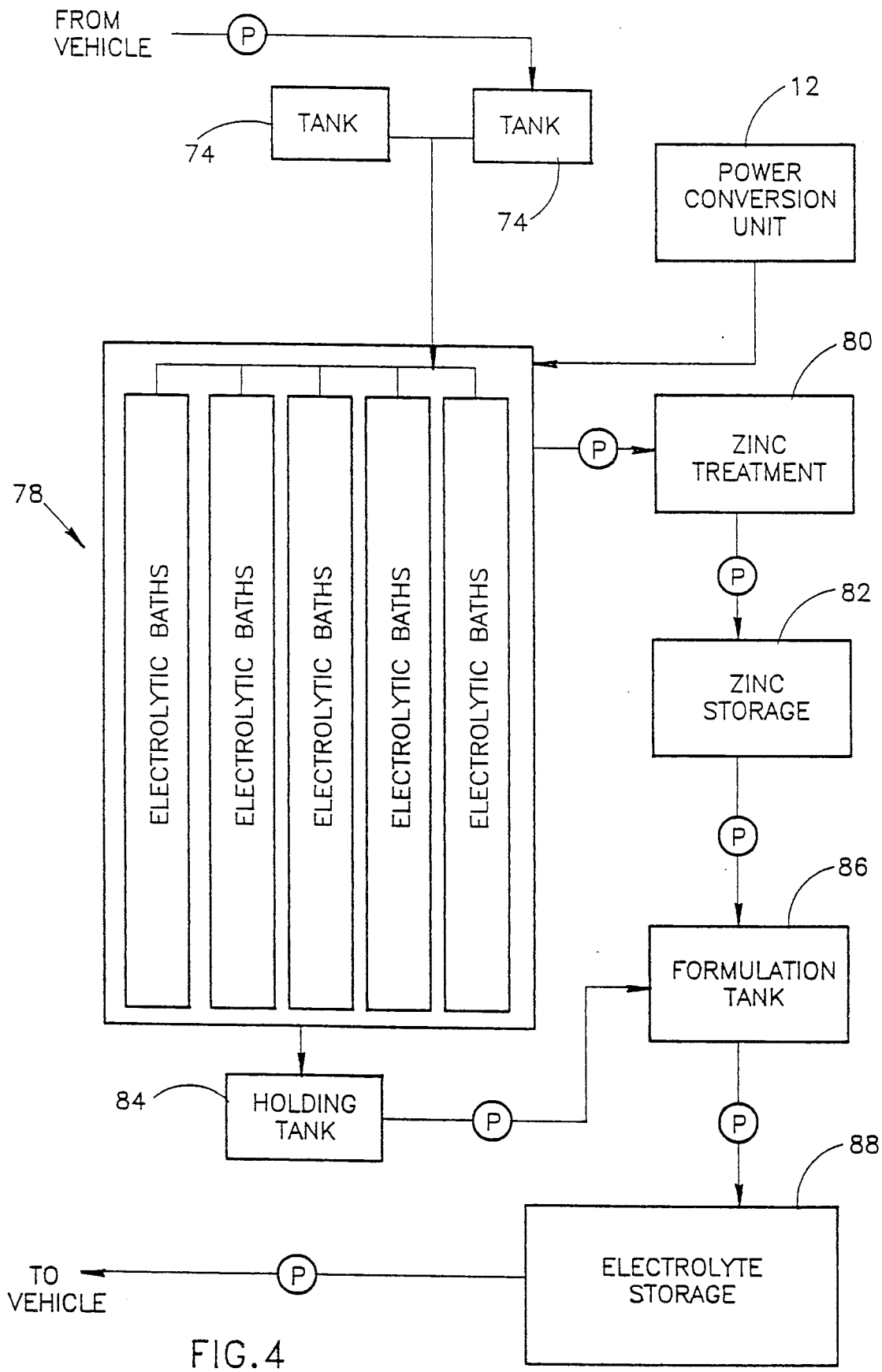
FIG. 4 is a pictorial block diagram of a electrolyte regeneration facility forming part of the system of FIGS. 1 and 2.

Reference is now made to FIG. 4, which illustrates a electrolytic reprocessing subsystem, which is indicated generally by reference numeral 16 in FIG. 1. Discharged slurry, here of the composition: unreacted zinc granules, zinc oxide and alkaline potassium hydroxide solution, stored in tanks 74, is supplied to a bank of electrolytic baths 78, such as modified alkaline zinc plating baths with scrapers for periodically removing zinc deposits thereon. Baths 78 receive an electrical input from power conversion unit 12 (FIG. 1).

Freshly generated zinc mixed with alkaline potassium hydroxide solution is pumped from electrolytic baths 78 to a zinc treatment facility 80, such as a classifier for particle sizing, which provides a purified zinc output to a storage tank 82. KOH is received from electrolytic baths 78 and is supplied to a holding tank 84. The contents of tanks 82 and 84 are supplied to a formulation tank 86 in which they are combined to provide a recharged slurry. The recharged slurry is stored in a storage tank 88.

Figure 5:
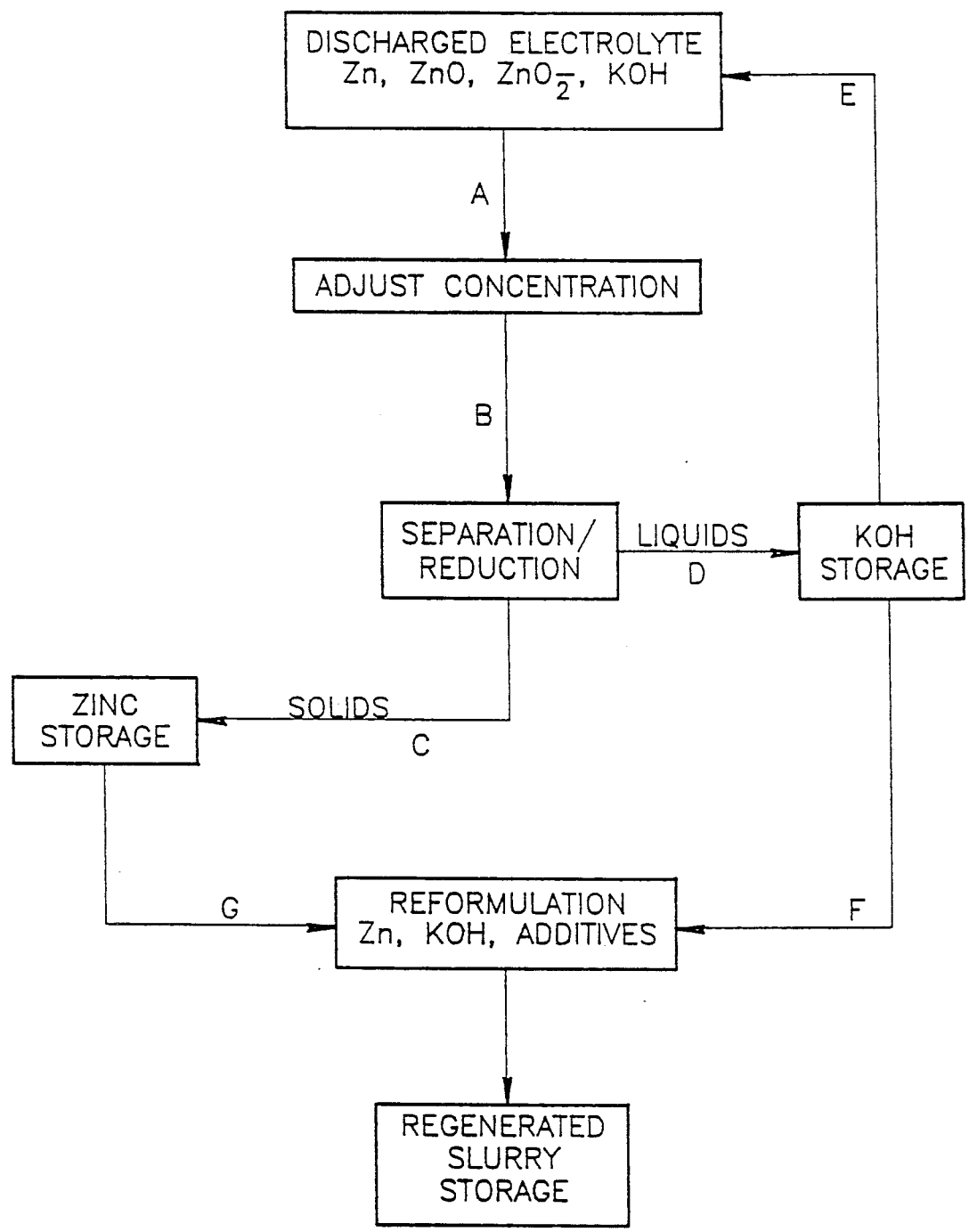
FIG. 5 is a flow-chart of the operation of the regeneration facility of FIG. 4.

Reference is now made to FIG. 5, which describes the operation of the apparatus of FIG. 4. It is see that the discharged electrolyte slurry containing Zn, ZnO, $ZnO_2^=$ and KOH has its concentration adjusted by the addition of KOH. Subsequently, the discharged electrolyte having a predetermined concentration undergoes separation and reduction, the KOH being removed to a KOH storage tank such as tank 86 (FIG. 4) and the solids being supplied to a zinc storage facility, such as tank 82 (FIG. 4). The zinc is supplied to a reformulation facility such as tank 84 (FIG. 4) in which KOH and other additives are added to the zinc to provide a regenerated slurry which is stored as in tank 88 (FIG. 4).

Figure 6:
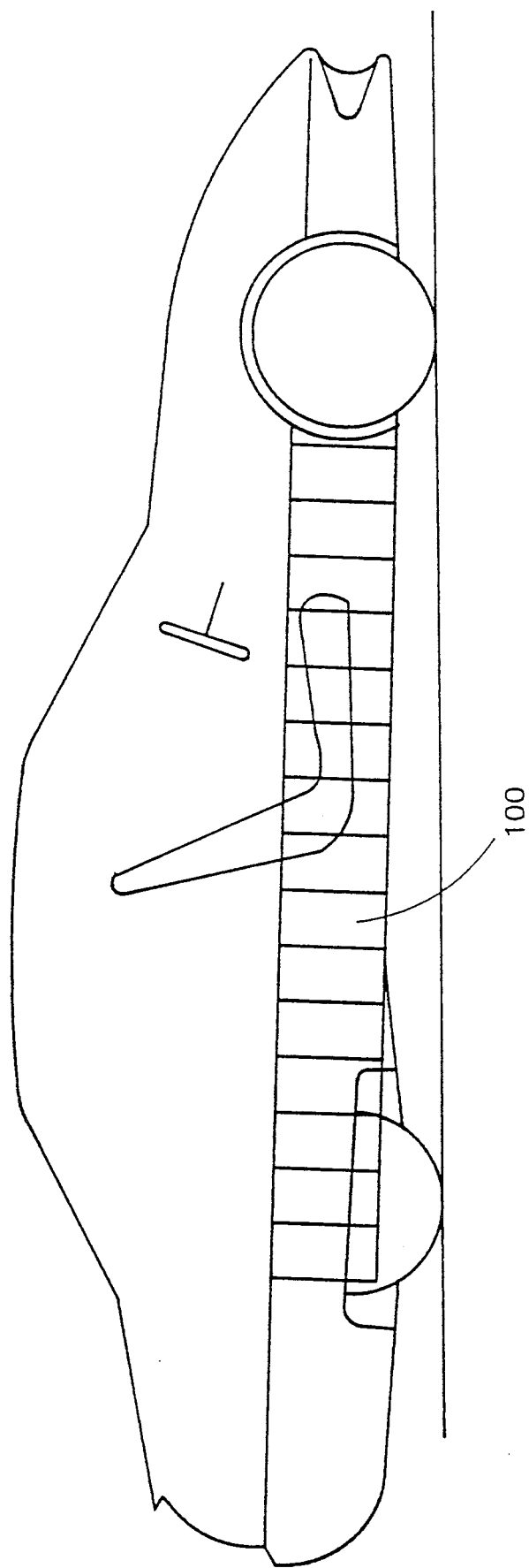

Reference is now made to FIG. 6, which illustrates a typical electric car, including a zinc air battery 100. As seen with greater particularity in FIG. 9, the zinc-air battery 100 is typically located centrally along the longitudinal axis of the car and is mounted on frame rails 102. Provision is made for distilled water dropping tubes 104 and a scrubbed air flow channel 106 within an air tight enclosure 108, which surrounds the battery cells 110. Enclosure 108 is typically covered by thermal and acoustic insulation 112. The structure of the battery and its function may be based on known principles and designs which are set forth, inter alia in the references cited in the Background of the Invention section hereinabove, the disclosures of which are hereby incorporated by reference.

Reference is now made to FIGS. 7, 8A, 8B and 8C which illustrate the general configuration of an electric driven van useful in the present invention. As seen in FIG. 7, the van is provided with two zinc-air battery banks 120 and 122 on opposite sides of the body. An auxiliary lead-acid battery 124 is preferably provided in addition. A power switching system 126 governs the supply of power to and from the various batteries.

Figure 8C:
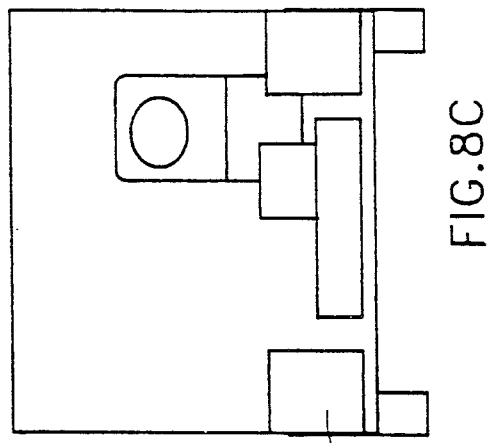
FIGS. 8A, 8B and 8C are respective side, top and end view schematic illustrations of the vehicle of FIG. 7, illustrating the general location of major operating systems therein.
Figure 8A:
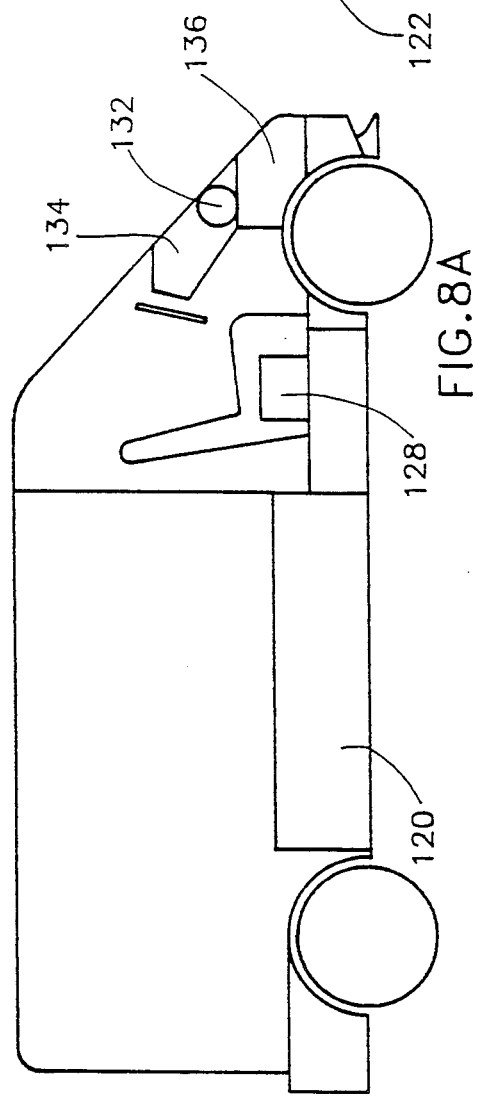
Figure 8B:
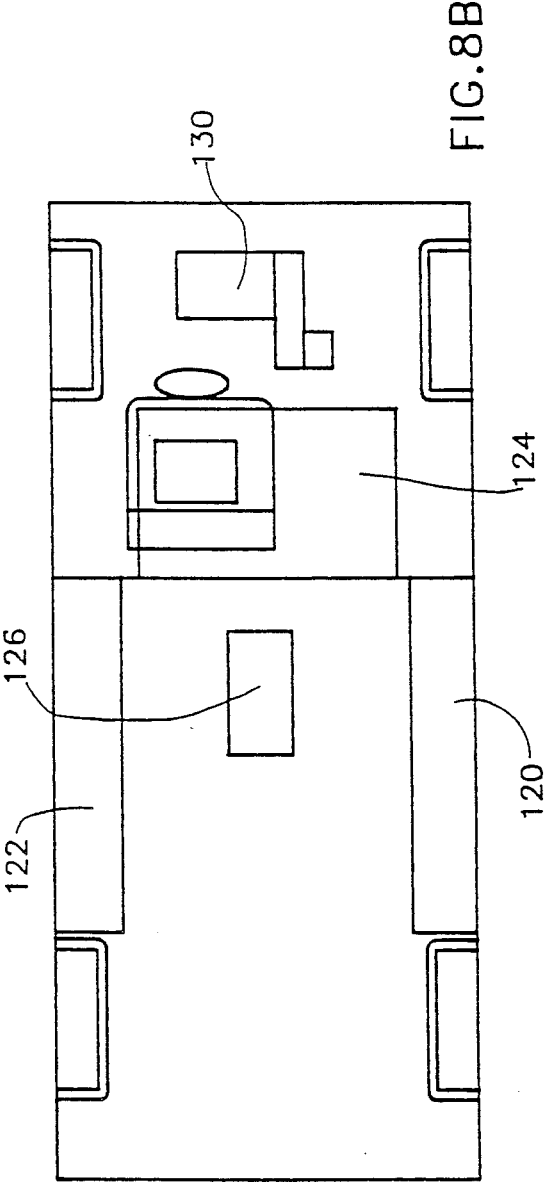

FIGS. 8A, 8B and 8C also illustrate preferred locations of a 12 volt vehicle utility battery 128, a traction motor and drive 130, a cabin heater 132, and a DMS (Driving Management System) 134.

Figure 10:
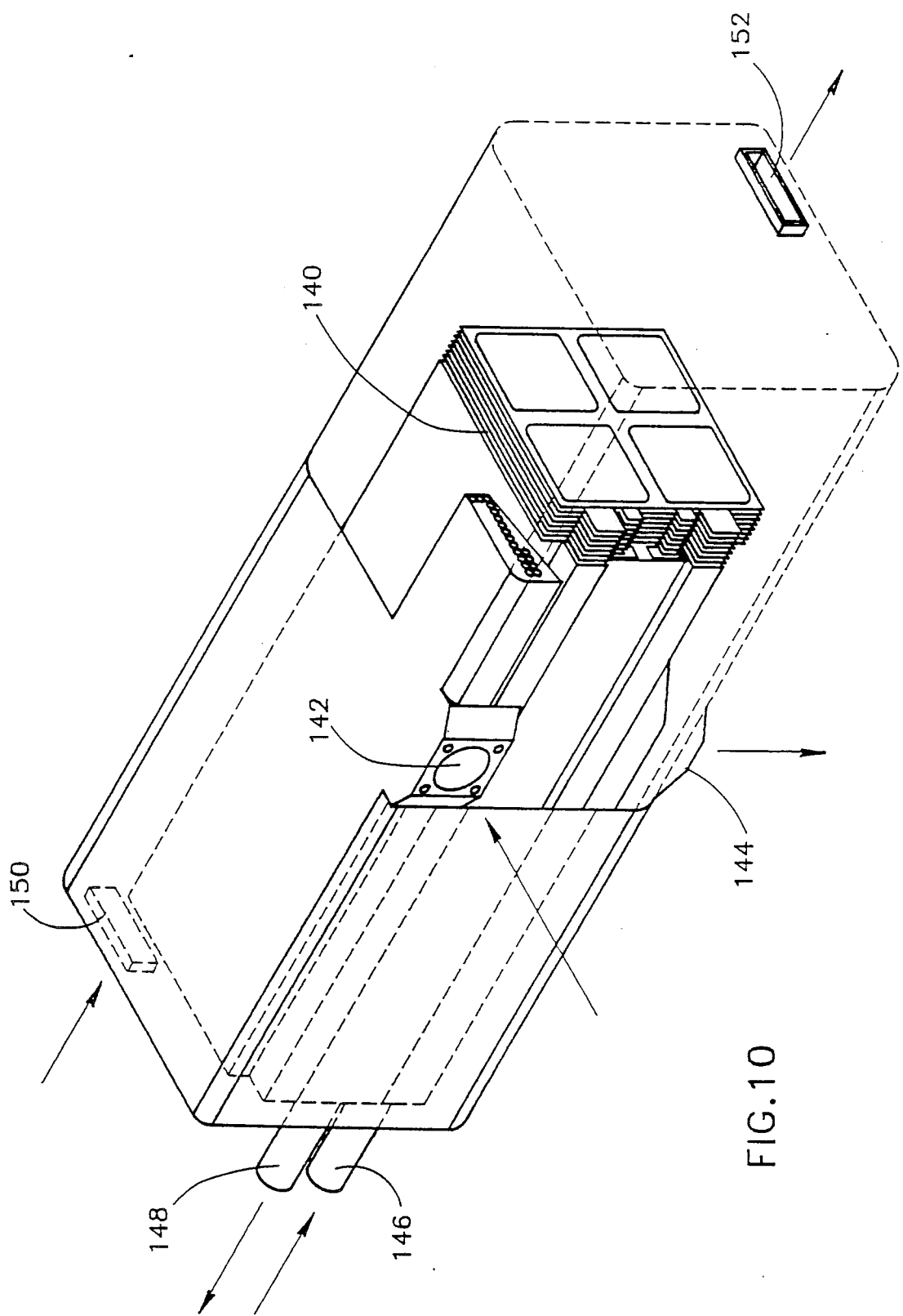
FIGS. 10 and 11 are respective views of two variations of a zinc-air battery suitable for use in electric vehicles.

Reference is now made to FIG. 10, which illustrates one embodiment of zinc-air battery suitable for powering an electric vehicle. The battery includes a multiplicity of cells 140 which are arranged in association with a slurry filling port 142, a slurry drain port 144 as well as coolant inlets and outlets 146 and 148, respectively and treated air inlets and outlets 150 and 152, respectively.

Figure 11:
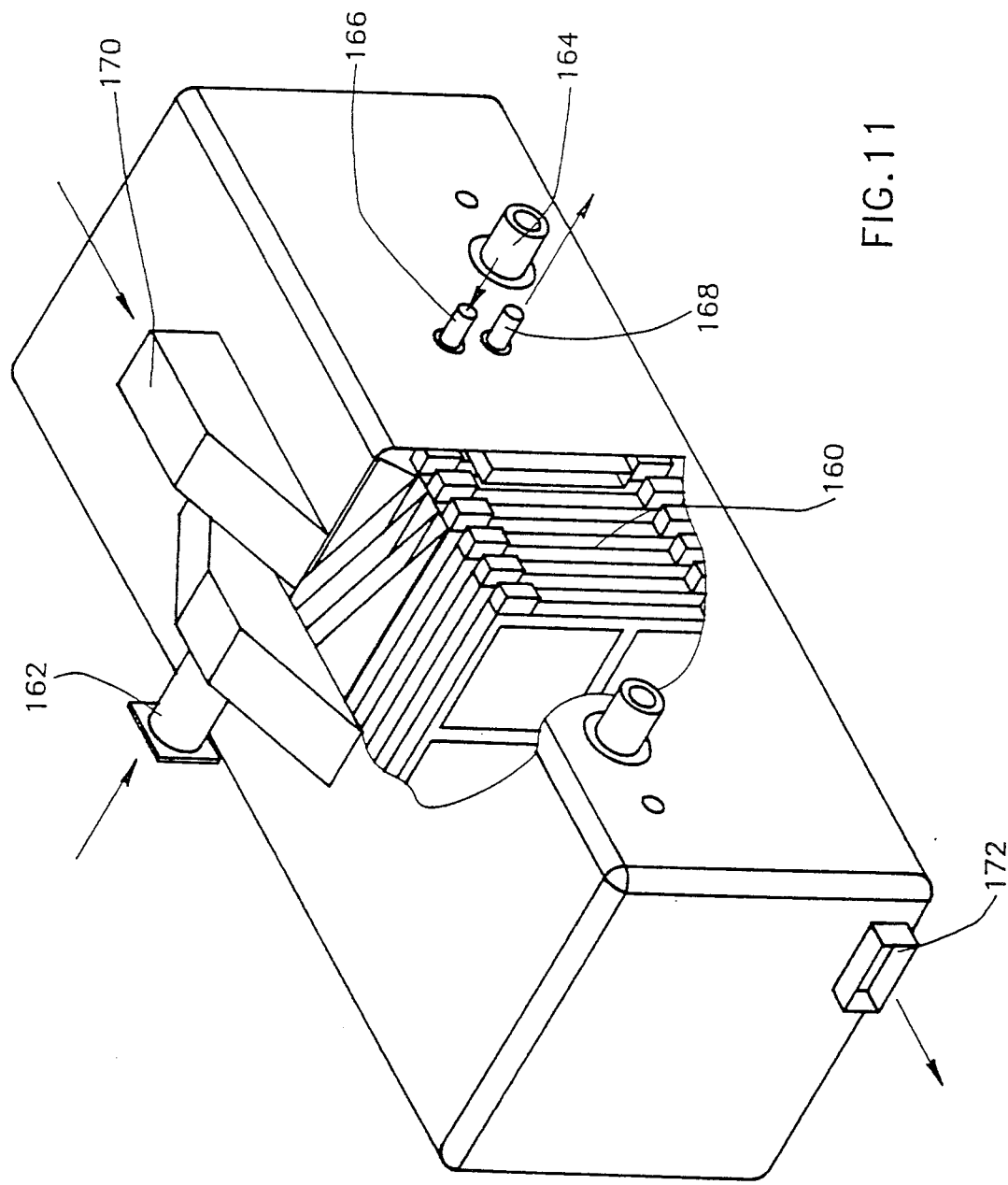

An alternative battery configuration is illustrated in FIG. 11 and includes a multiplicity of cells 160 which are arranged in association with a slurry filling port 162, a slurry drain port 164 as well as coolant inlets and outlets 166 and 168, respectively and treated air inlets and outlets 170 and 172, respectively.

Figure 12:
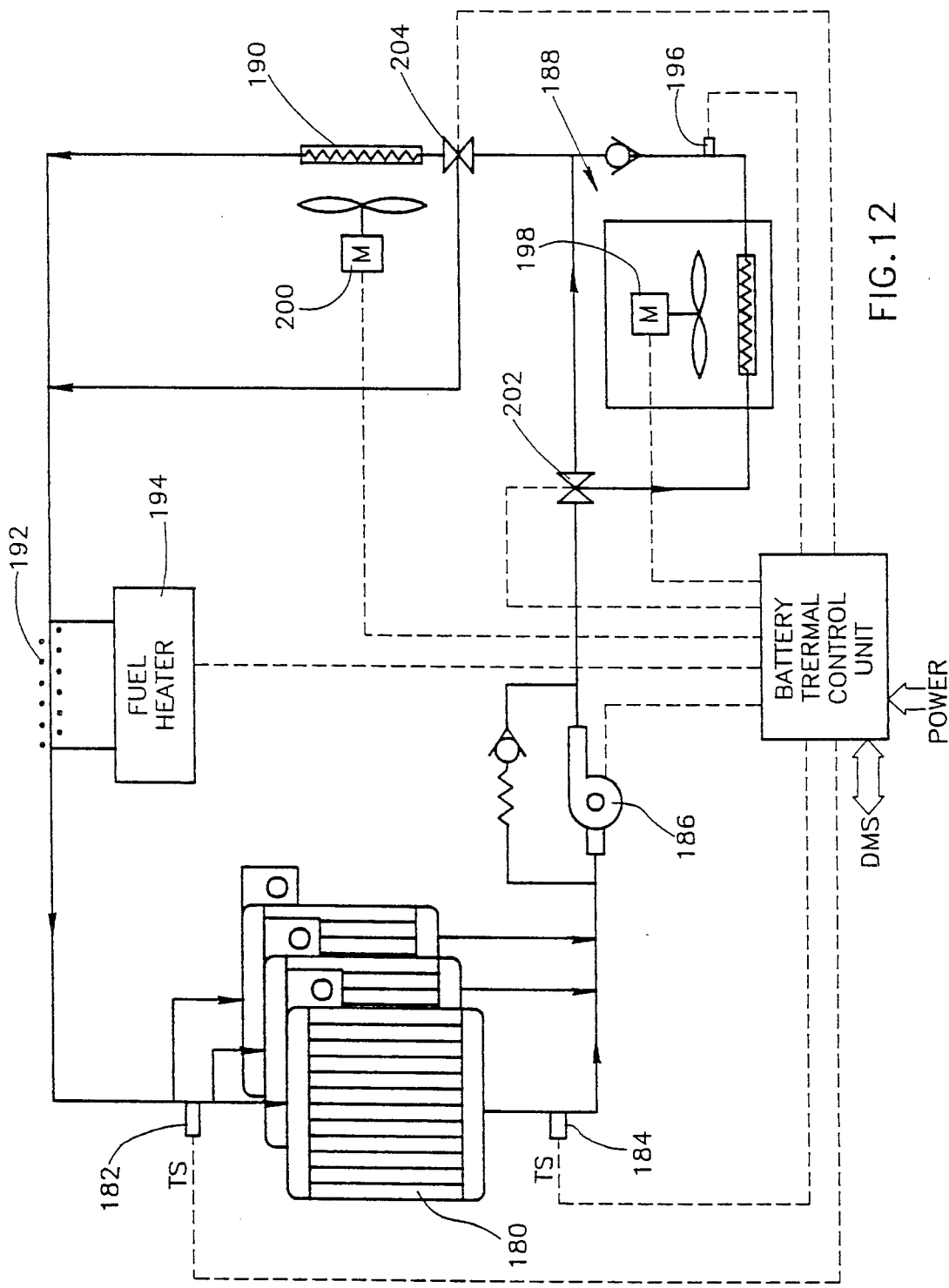
FIG. 12 is a schematic illustration of a thermal management subsystem useful in the vehicles of FIGS. 6 and 7.

FIG. 12 illustrates a thermal management arrangement for an electric vehicle battery of the type illustrated in FIGS. 10 and 11. The battery is indicated by reference numeral 180. A coolant passes therethrough as indicated in solid lines. Temperature sensors 182 and 184 are located respectively at the coolant inlets and outlets to the battery 180.

Heated coolant from the battery 180 is supplied via a circulating pump assembly 186 via a cabin heating system 188, for heating of the vehicle cabin as necessary and via a radiator assembly 190 for cooling of the coolant.

Operation of the entire system is governed by a suitable battery thermal control units, which receives inputs from temperature sensors 182 and 184 as well as from a temperature sensor 196 associated with the cabin heating system 188 and provides control outputs to cabin heat system fan motor 198 and radiator fan motor 200 as well as control inputs to the fuel heater 194, pump 186, and a cabin heating system input valve 202 and a radiator input valve 204.

Figure 13:
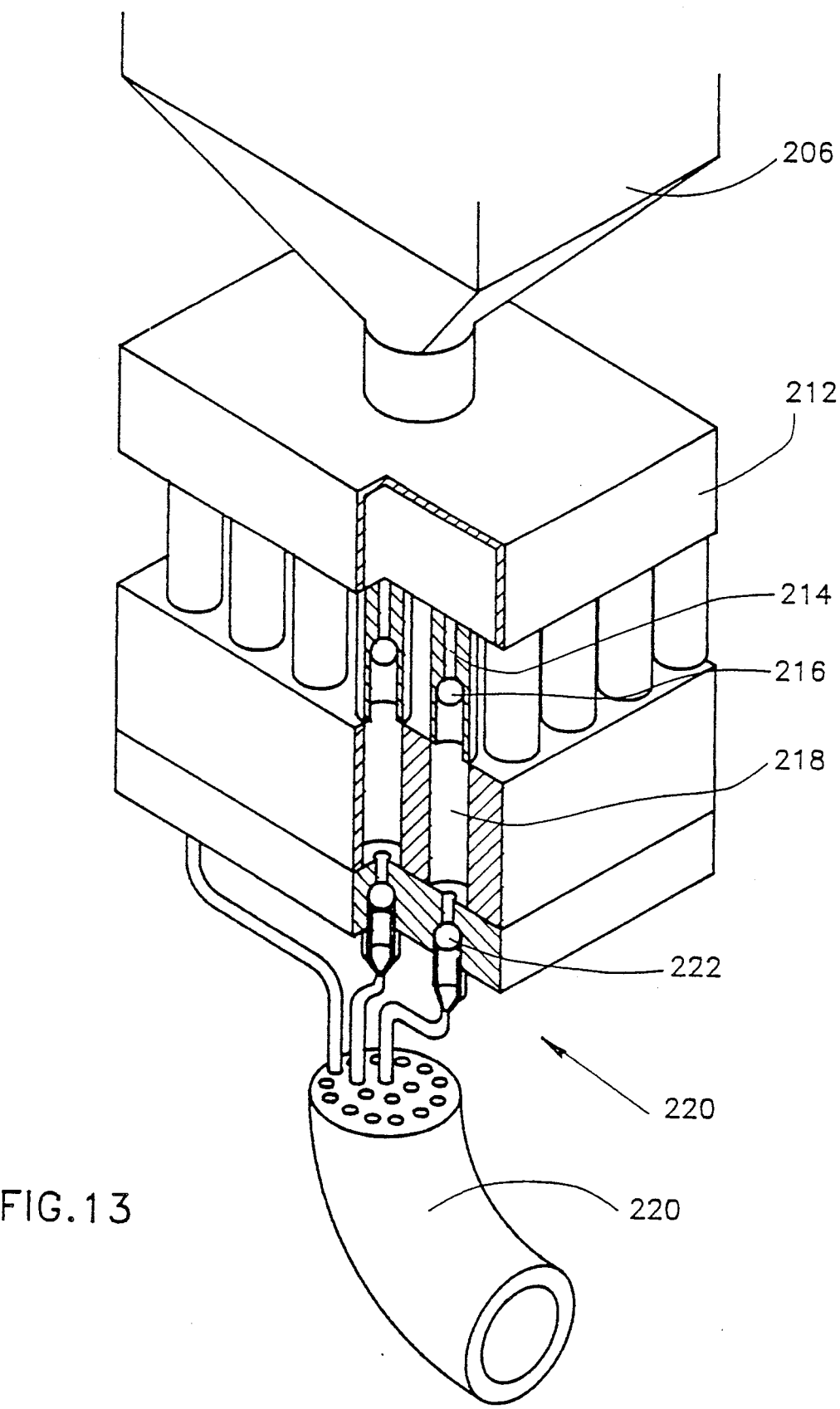
FIG. 13 is a schematic illustration of a multi-cell metering pump assembly useful in the system of FIGS. 1 and 2.
Figure 14:
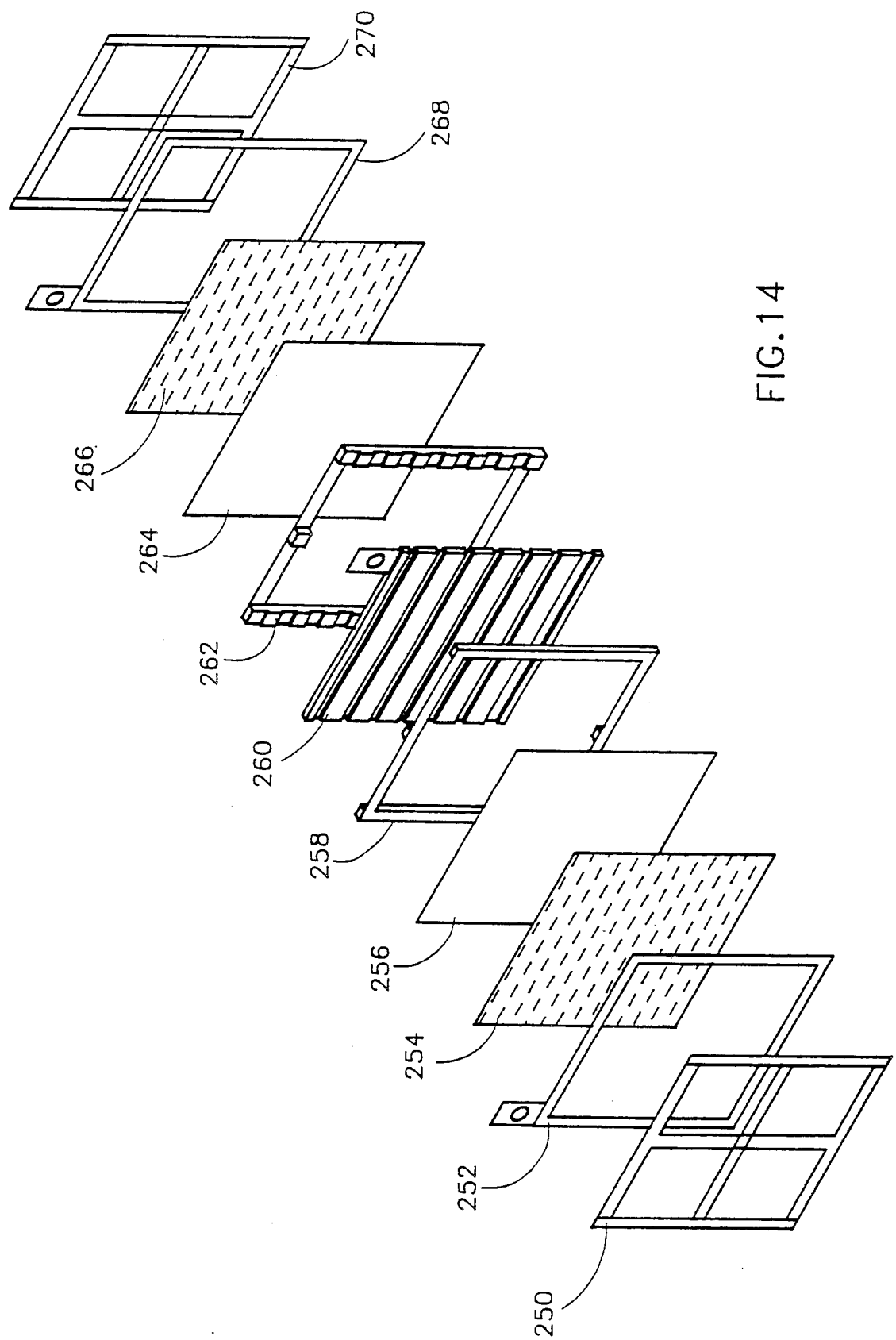
FIG. 14 is an exploded view of an zinc-air battery cell useful in the present invention.

Reference is now made to FIG. 13, which illustrates a typical arrangement for metering the supply and drain of slurry in a battery unit. The apparatus shown in FIG. 13 includes a recharged slurry tank 206, which outputs into a manifold 212 having a plurality of outlets 214, each of which is supplied with a non-return valve 216 and communicates with a battery cell 218. Draining of slurry from the battery cells 218 takes place via an outlet manifold arrangement 220 including non-return valves 222 for each cell. A common drain conduit 224 is provided for the removal of discharged slurry.

Reference is now made to FIGS. 14, 15, 16 and 17 which describe the construction of a modular zinc air battery according to the present invention. It is seen that each cell includes a plastic frame 250, a current collector 252, typically formed of nickel mesh, an air electrode 254, typically formed of a wet-proofed, catalyzed carbon layer formed on the nickel mesh, a separator 256, typically formed of non-woven porous nylon, a plastic frame 258, a central current collector 260, typically formed of nickel plated copper, a plastic frame 262, a separator 264, typically formed of non-woven porous nylon, an air electrode 266, typically formed of a wet-proofed, catalyzed carbon layer bonded to nickel mesh, a current collector 268 typically formed of nickel mesh, and a plastic frame 270, typically formed of polypropylene.

Figure 15:
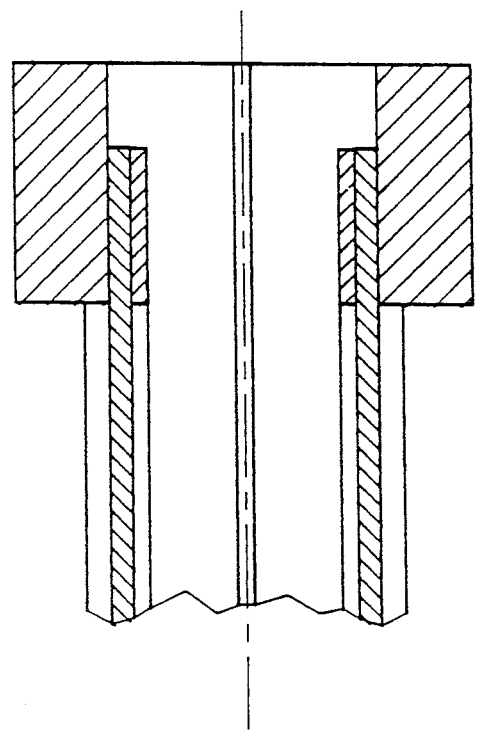
FIG. 15 is a partial sectional view of the assembly of the battery cell of FIG. 14.
Figure 16:
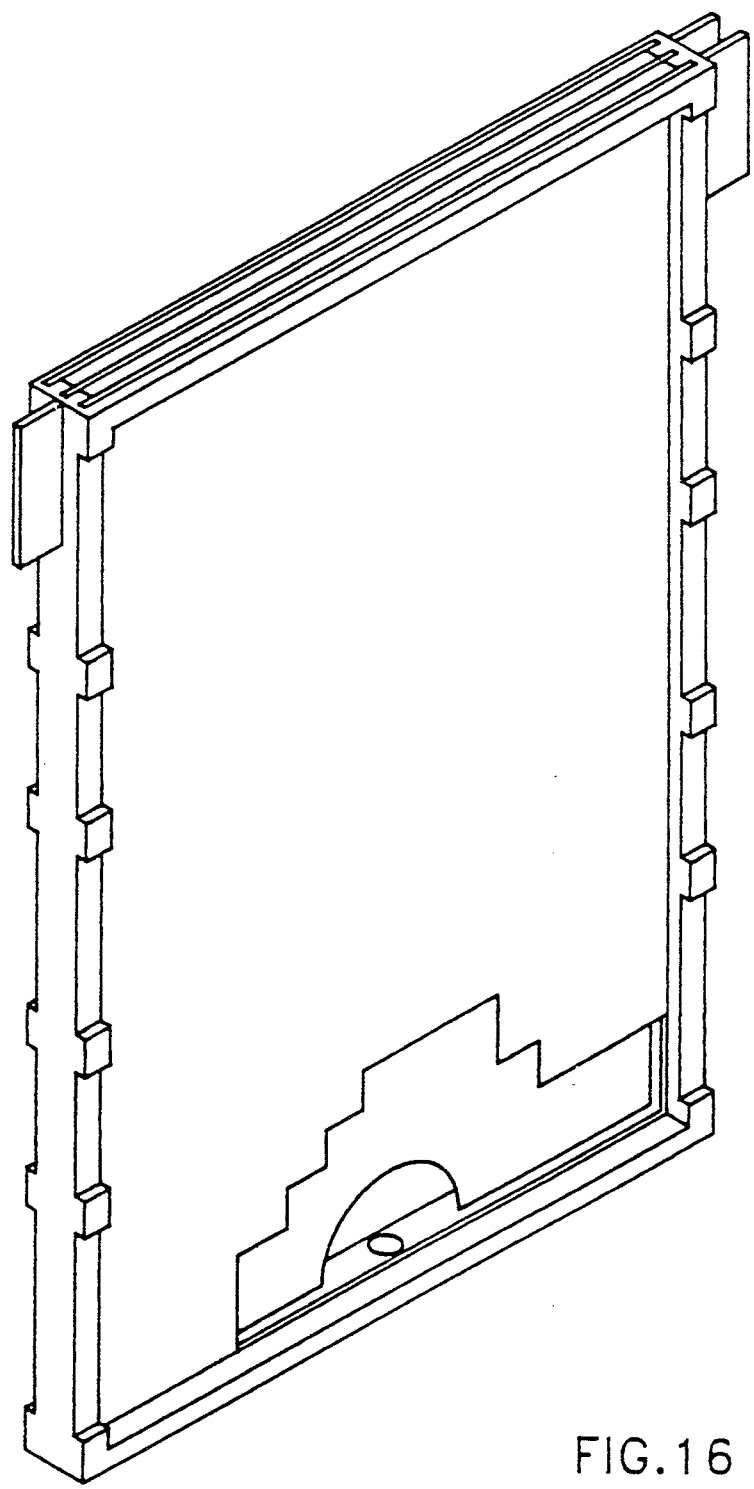
FIG. 16 is a perspective view of the battery cell of FIG. 14.
Figure 17:
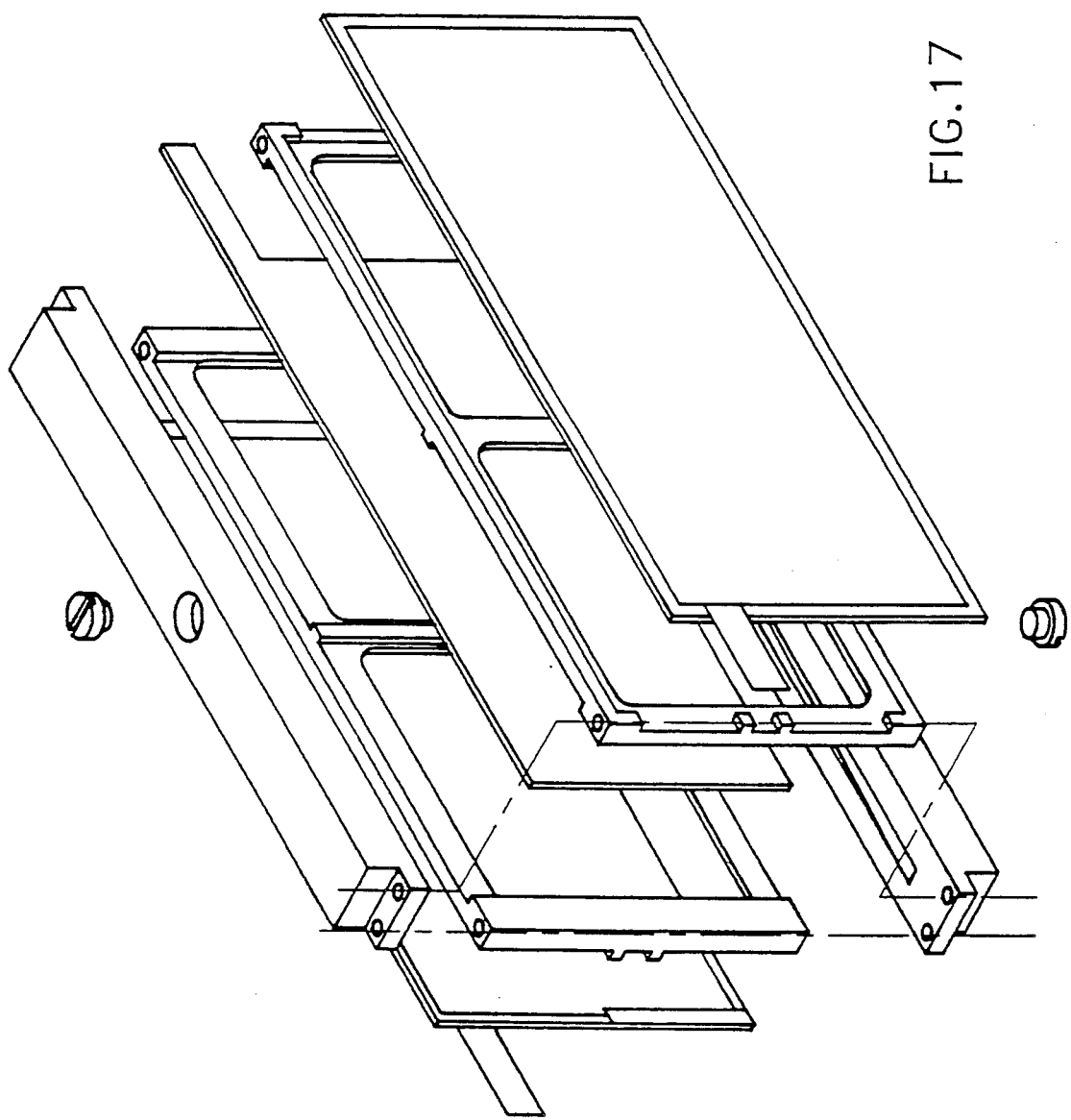
FIG. 17 is an exploded view of the assembly of the battery cell of FIG. 14.

FIG. 15 illustrates a section of an individual cell taken through its narrowest dimension. FIG. 16 illustrates such a cell in a partially cut away illustration, and FIG. 17 shows a cell assembly in exploded view.

Figure 19:
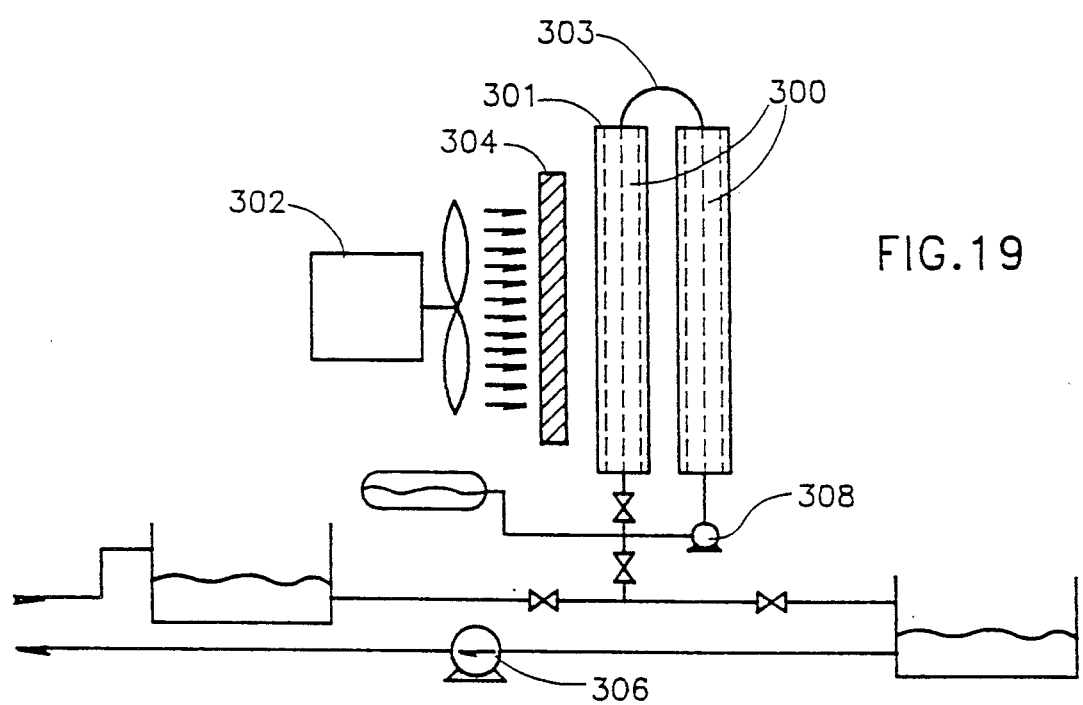
FIG. 19 is a schematic illustration of the connection of the battery of FIG. 18 in its operating environment.
Figure 18:
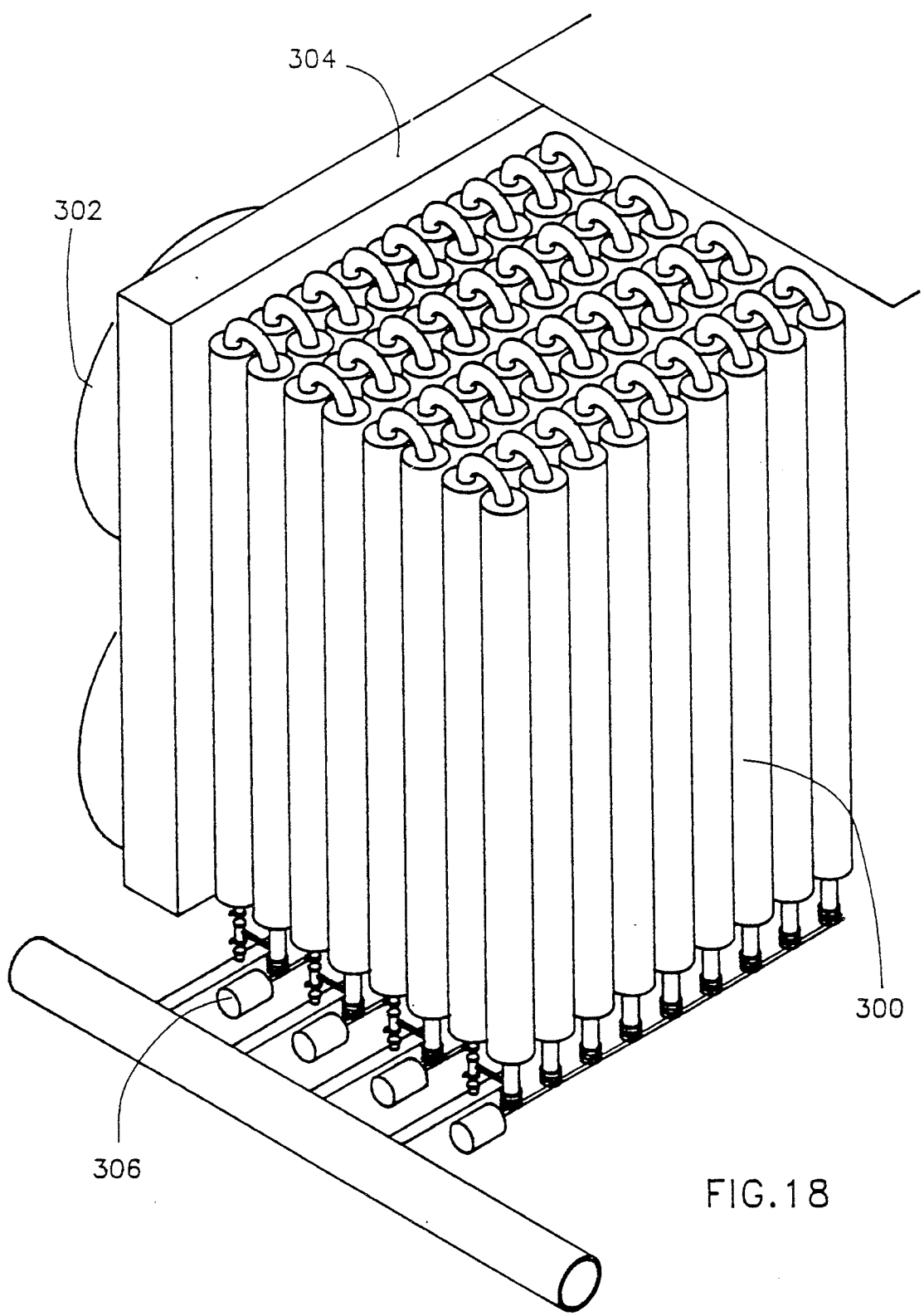
FIG. 18 is a perspective view of a zinc air utility storage battery useful in the system of FIGS. 1 and 2.
Figure 20:
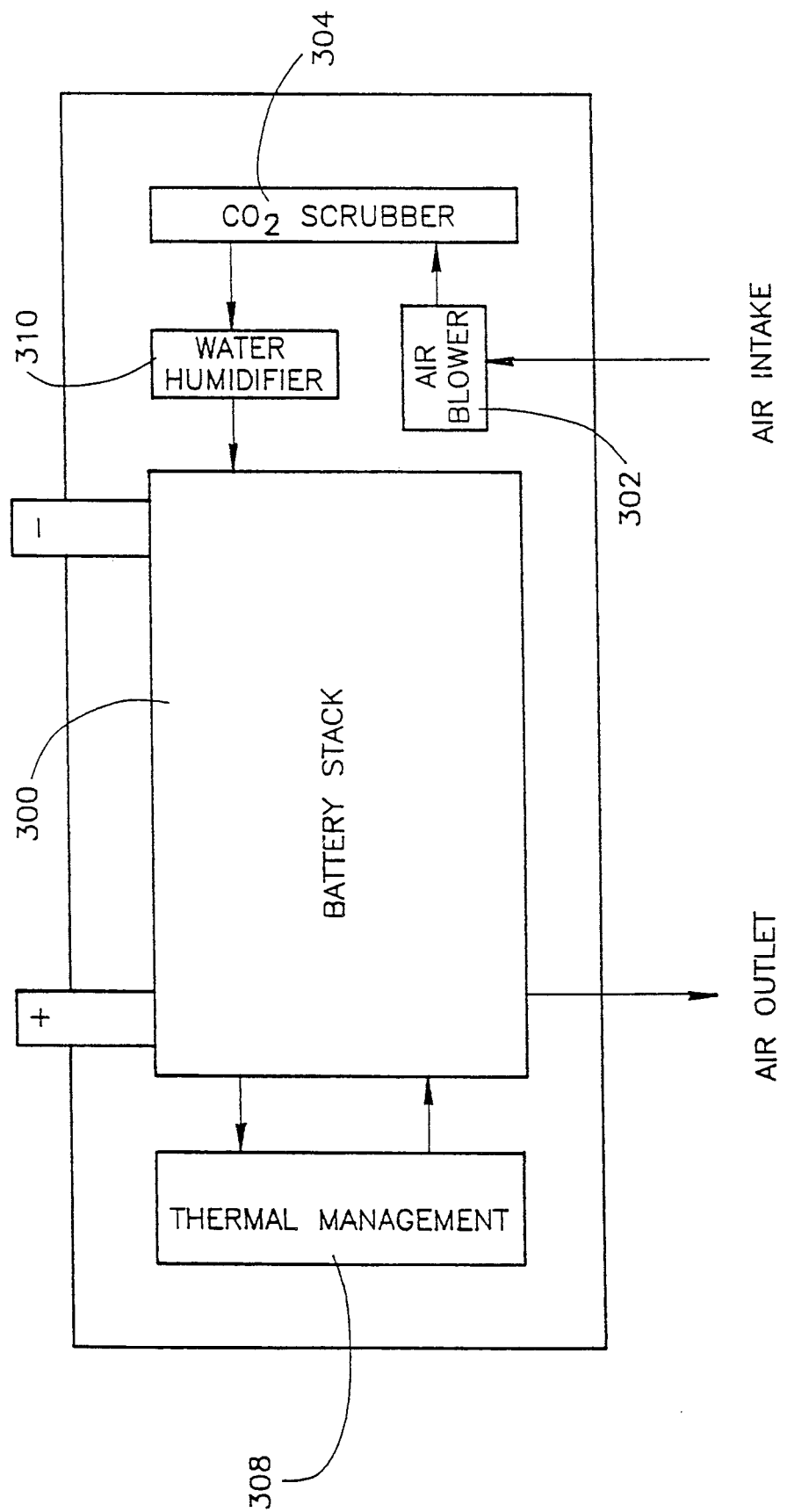
FIG. 20 is a block diagram illustrating the principal functional components of the battery of FIG. 19.

Reference is now made to FIGS. 18, 19 and 20 which illustrate the general configuration of a zinc-air utility storage battery. It is noted that the battery comprises a multiplicity of cells 300, each containing, inter alia an air electrode 301 and a current collector 303, connected in series. Air is supplied from the outside atmosphere by a blower 302 via a $CO_2$ scrubber 304.

Slurry is pumped to and from the cells 300 by pumps 306. Thermal management apparatus 308 is provided as is a water humidifier 310. Apparatus 308 is operative to ensure optimum operating temperatures for the battery irrespective of the local ambient and deals with parasitic heat generated by the battery during discharge. Humidifier 310 is operative to control the humidity of the incoming air to the battery and prevents slurry dry-out.

Figure 21:
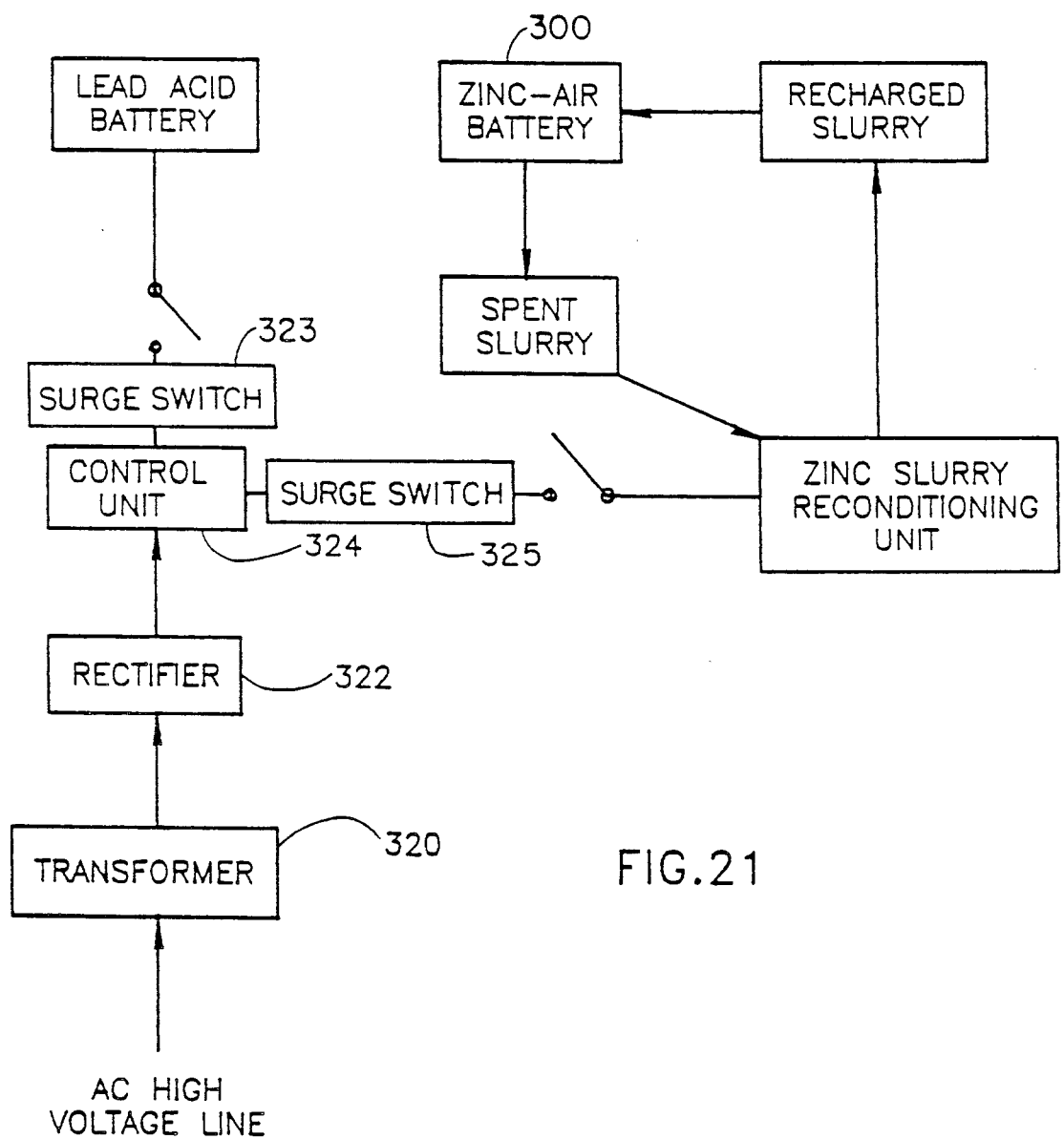
FIGS. 21 and 22 are flow chart illustrations of power station utility battery charging and discharging functions respectively.
Figure 22:
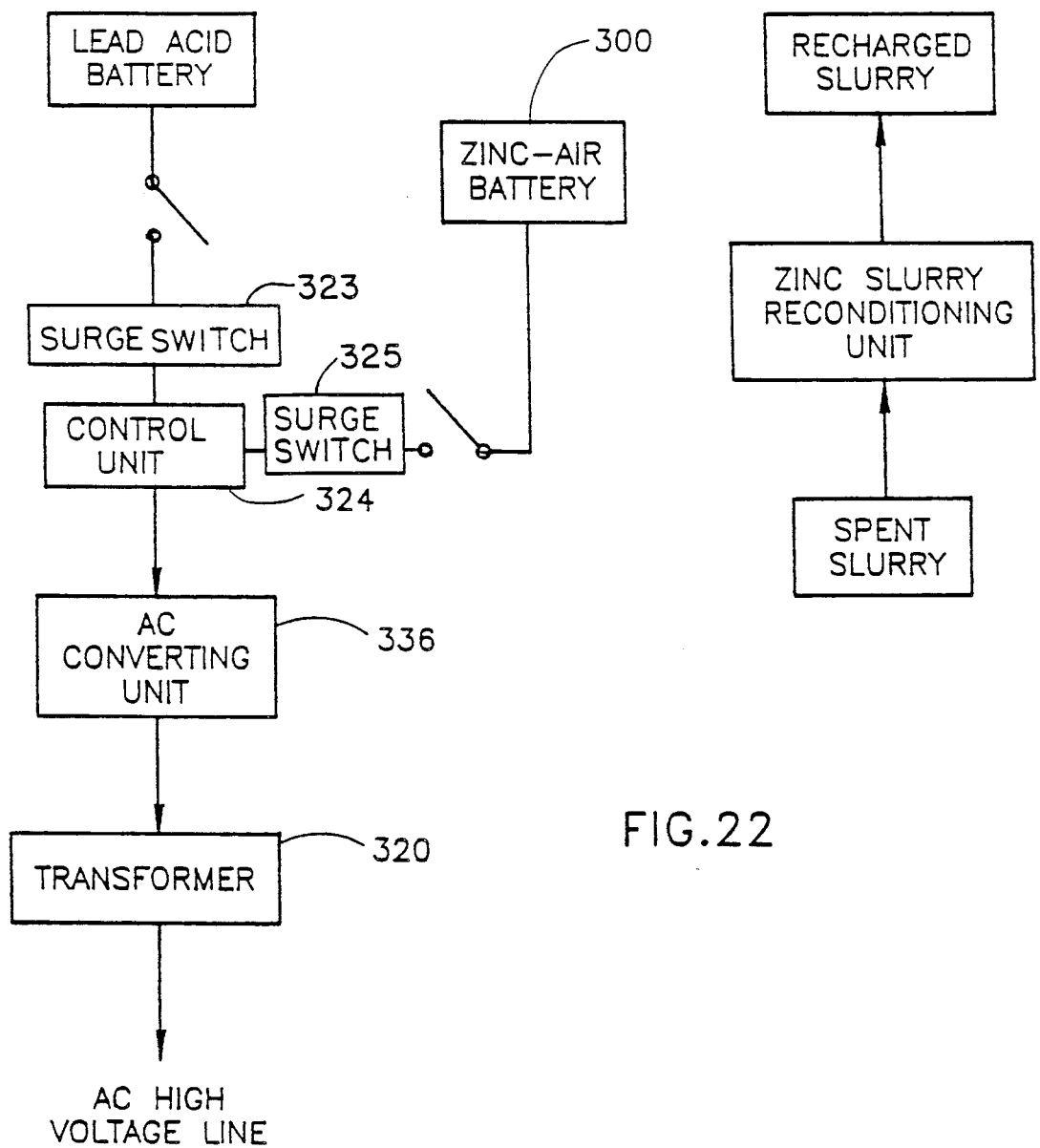

Reference is now made to FIGS. 21 and 22 which illustrate the function of the utility battery during respective charging and discharging operations. During charging, AC line power is supplied via a transformer 320, rectifier 322 and control unit 324 to the battery. The electric power storage device further includes surge switches 323, 325 for enabling the storage device to absorb undesired surges from the electric utility.

During discharge, as illustrated in FIG. 22, power from the battery 300 is supplied via control unit 324, AC converting unit 336 and transformer 320 to the AC line.

It will be appreciated by persons skilled in the art that the present invention is not limited by what has been particularly shown and described hereinabove. Rather the scope of the present invention is defined only by the claims which follow:

I claim:

1. An electrical energy system comprising:
   an electric utility having an electricity generating apparatus and distribution lines;
   a plurality of electric vehicles;
   each electric vehicle including a metal/air battery operated by a liquid-like slurry;
   means for removing spent slurry form said vehicle battery;
   means for re-charging said spent slurry received from said removing means externally said a vehicle; and
   electric power storage means receiving electrical power from the electric utility and being connected to said re-charging means so as to supply electrical power to the plurality of electric vehicles and to the electric utility when required.

2. A system according to claim 1 and wherein said electric power storage means is operative to receive electrical power from the electrical utility at low power demand times and to provide electrical to the electrical utility at high power demand times.

3. A system according o claim 1 and wherein said electric power storage means includes surge switching means for enabling the electric power storage means to absorb undesired power surges from the electrical utility as needed.

4. A system according o claim 1 and wherein said electric power storage means is operative to provide electrical power to the electrical utility at high power demand items.

5. A system according to claim 1 and wherein said electric power storage means is operative to provide electrical power to the electrical utility as needed to serve as a spinning reserve.

6. A system according to claim 1 and wherein said electric power storage means also comprises lead-acid batteries.

7. A system according to claim 6, wherein said lead-acid batteries are employed for relatively more frequent charging and discharging, while the metallic batteries which are operated by the liquid-like slurry employed for less frequent charging and discharging.

8. A system according to claim 1 wherein said means for removing spent slurry from vehicles is part of an electric vehicle recharging depot along with means for supplying said slurry to a storage facility to await recharging at low power demand times and means for supplying recharged slurry to vehicle from the electric power storage means.

9. An electrical energy system for use with an electric utility having an electricity generating apparatus and distribution lines, said system comprising:
   a plurality of electric vehicles;
   each electric vehicle including a metal-air battery operated by a liquid-like slurry;
   means for removing spent slurry from said vehicle battery;
   means for re-charging said spent slurry received from said removing means external of a said vehicle;
   means for storing said spent slurry being connected to said recharging means; and
   electric power storage means receiving electrical power from the electric utility and being connected to said re-charging means so as to supply electrical power to the plurality of electric vehicles and to the electric utility when required.

10. A system according to claim 9 wand wherein said electric power storage means is operative to receive electrical power from the electrical utility at low power demand times and to provide electrical power to the electrical utility at high power demand times.

11. A system according to claim 90 and wherein said electric power storage means includes surge switching means for enabling the electric power storage means to absorb undesired power surges from the electrical utility as needed.

12. A system according to claim 9 and wherein said electric power storage means is operative to provide electrical power to the electrical utility at high power demand times.

13. A system according to claim 9 and wherein said electric power storage means is operative to provide electrical power to other electrical utility as needed to serve as a spinning reserve.

14. A system according to claim 90 and wherein said electric power storage means also comprises lead-acid batteries.

15. A system according to claim 14 and wherein said lead-acid batteries are employed or relatively more frequent charging and discharging, while the metal/air batteries which are operated by the liquid-like slurry are employed for less frequent charging and discharging.

16. A system according to claim 9 wherein said means for removing spent slurry from vehicles is part of an electric vehicle recharging debt along with means for supplying it to a storage facility to await recharging at low power demand times and means for supplying recharged slurry to vehicles form the electric power storage means.

17. An electrical energy system comprising:
   an electric utility having an electricity generating apparatus and distribution lines;
   a plurally of electric vehicles;
   electric power storage means receiving electrical power from the electric utility and supplying electrical power to the plurality of electric vehicles nd to the electric utility when required; and
   wherein said electric power storage means includes surge switching means for enabling the electric power storage mans to absorb undesired power surges from the electrical utility as needed.

* * * * *